(12) United States Patent
Liu et al.

(10) Patent No.: US 6,591,861 B2
(45) Date of Patent: Jul. 15, 2003

(54) CLOSED WATER-CONTAINER STORING DEVICE WITH WATER INLET/OUTLET

(75) Inventors: Li-Tai Liu, Taipei (TW); Li-Yen Liu, Taipei (TW)

(73) Assignee: An Ho Hsing Co., Ltd., Taipei (TW)

( * ) Notice: Subject to any disclaimer, the term of this patent is extended or adjusted under 35 U.S.C. 154(b) by 0 days.

(21) Appl. No.: 09/850,386

(22) Filed: May 7, 2001

(65) Prior Publication Data

US 2002/0162588 A1 Nov. 7, 2002

(51) Int. Cl.⁷ ............................................. F16K 31/18
(52) U.S. Cl. ..................... 137/434; 137/434; 441/198; 169/25
(58) Field of Search ................. 137/434, 409, 137/590; 141/198, 114, 313; 169/25; 220/495.03, 495.06, 495.01; 222/206, 192, 64, 67, 105, 106, 183, 212; 261/DIG. 11

(56) References Cited

U.S. PATENT DOCUMENTS

| | | | | |
|---|---|---|---|---|
| 2,321,836 A | * | 6/1943 | Marzo .................. | 220/495.03 |
| 2,564,163 A | * | 8/1951 | Leperre ................ | 141/114 |
| 3,270,797 A | * | 9/1966 | McLeod ............... | 220/495.06 |
| 3,679,092 A | * | 7/1972 | Sullivan ............... | 137/590 |
| 3,917,115 A | * | 11/1975 | Travers et al. ........ | 222/3 |
| 3,945,392 A | * | 3/1976 | Deaton et al. ........ | 137/434 |
| 4,821,896 A | * | 4/1989 | Cheng .................. | 220/495.03 |
| 4,863,339 A | * | 9/1989 | Krein ................... | 220/403 |
| 4,887,633 A | * | 12/1989 | Taylor, Jr. ............ | 141/114 |
| 5,059,084 A | * | 10/1991 | Krein ................... | 220/403 |
| 5,163,485 A | * | 11/1992 | Hermann .............. | 141/114 |
| 5,397,020 A | * | 3/1995 | Witt ..................... | 220/404 |
| 5,480,057 A | * | 1/1996 | Papaluca .............. | 220/403 |
| 5,881,692 A | * | 3/1999 | Lassanske ............ | 220/495.06 |
| 6,000,549 A | * | 12/1999 | Perkins ................ | 220/495.03 |
| 6,032,818 A | * | 3/2000 | Olson ................... | 220/495.06 |
| 6,286,700 B1 | * | 9/2001 | Davidson ............. | 220/495.06 |

\* cited by examiner

Primary Examiner—George Walton
(74) Attorney, Agent, or Firm—Bucknam and Archer

(57) ABSTRACT

A closed water-container storing device with the water inlet/outlet, comprising a water storing bag container for storing water, a water inlet for the inflow of water from outside source to said water storing bag container, a water outlet for outflow of water within water storing bag container, and a float device for the control of stop/start operation of the inflow of water from outside source to said water storing bag container, when the water within said water storing bag container has reached a predetermined level.

4 Claims, 1 Drawing Sheet

CLOSED WATER-CONTAINER STORING DEVICE WITH WATER INLET/OUTLET

BACKGROUND OF THE INVENTION

Generally, this invention relates to a closed water-container storing device with water inlet/out and, particularly, to a closed water-container storing device with water inlet/out used in indoor/outdoor equipment, such as a water tower of a building, water jacket etc. . . . .

DESCRIPTION OF THE PRIOR ART

In recent years, people are gradually paying more attention to the sanitation of water and purification of water storing. Water towers are commonly used in most of buildings for storing water for daily consumption by the residents and companies of buildings. That is to say, water towers which contain lower towers for the inflow of water and upper towers for string/delivering water to residents are commonly used. Regular cleaning/sterilizing is usually utilized to keep said water towers hygiene. However, these works, such as cleaning, maintaining, and covering etc. are not effectively carried out due to bad management. Although government has been promoting the directly drinking tap water, people dare not try for the sake of the above-mentioned problems existed in the currently used water storing device.

Therefore, there is a demand to provide a water storing device with hygiene and with easiness of cleaning, which can be used in indoor/outdoor use.

DESCRIPTION OF THE INVENTION

It is an object of this invention to provide a closed water-container storing device with water inlet/outlet, which has the advantages of contamination-free and easiness for regular maintenance and replacement.

According to the present invention, the above object can be achieved by the closed water-container storing device with the water inlet/outlet, comprising:

a water storing bag container for storing water;

a water inlet for the inflow of water from outside supplying water to said water storing bag container;

a water outlet for outflow of water within water storing bag container; and a float device for control of stop/start operation of the inflow of water from outside source to said water storing bag container, when the water within said water storing bag container has reached a predetermined level.

The details of an embodiment of present invention will be illustrated and described in the accompanying drawings and the following specification.

Other features, objects and advantages of the present invention will become more apparent by the reference to the description and accompanying drawings and the appended claims.

BRIEF DESCRIPTION OF DRAWINGS

The same reference numbers in different drawings are indicated in the same parts.

DETAILED DESCRIPTION OF PREFERRED EMBODIMENT

Figure 1:
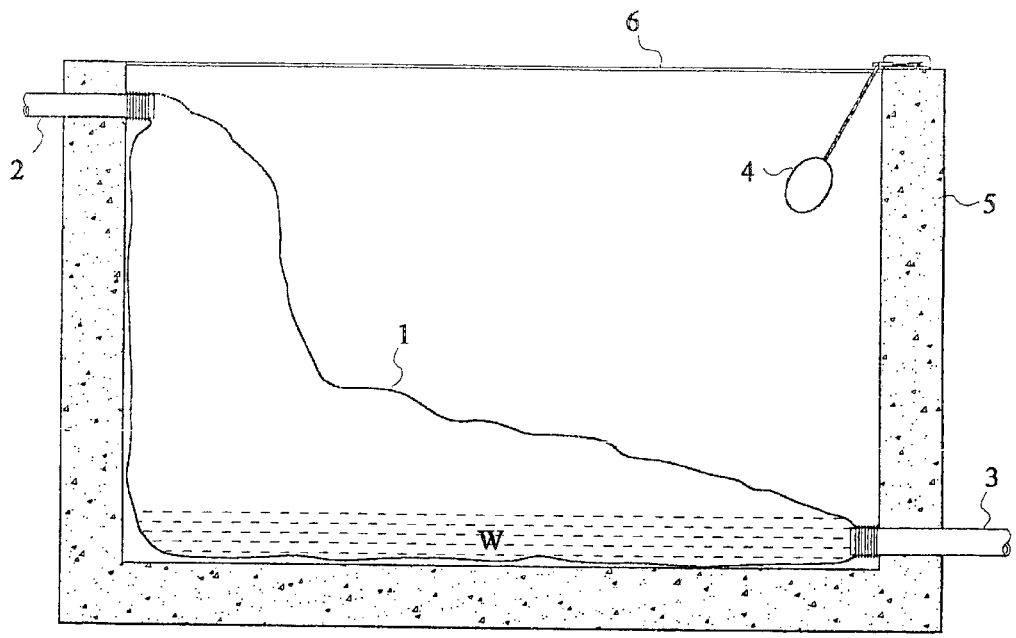
FIG. 1 is a schematic view of an embodiment of a closed water-container storing device with water inlet/outlet of present invention.

In FIG. 1, a schematic view of an embodiment of closed water-container storing device with water inlet/outlet of the present invention is shown, wherein said closed water-container storing device the with water inlet/outlet comprises: a water storing bag container 1 for storing water W, which water storing bag container 1 is made of rubber, plastic film, silicon of the like; a water inlet 2 for inflow of water supplied from outside source to said water storing bag container 1; a water outlet 3 for the outflow of water W stored within said water storing bag container 1; and a float device 4 for the control of stop/start operation of the Inflow of water from outside source to said water storing bag container 1 through said water inlet 2, when the water W within said water storing bag container 1 has reached a predetermined level.

As shown in FIG. 1, the closed water-container storing device with water inlet/outlet of the present invention can be located within a water tower 5 of a building, wherein an upper cover can be selectively used for the water tower in order to prevent said closed water-container storing device from sunshine, contamination and damage.

Figure 2:
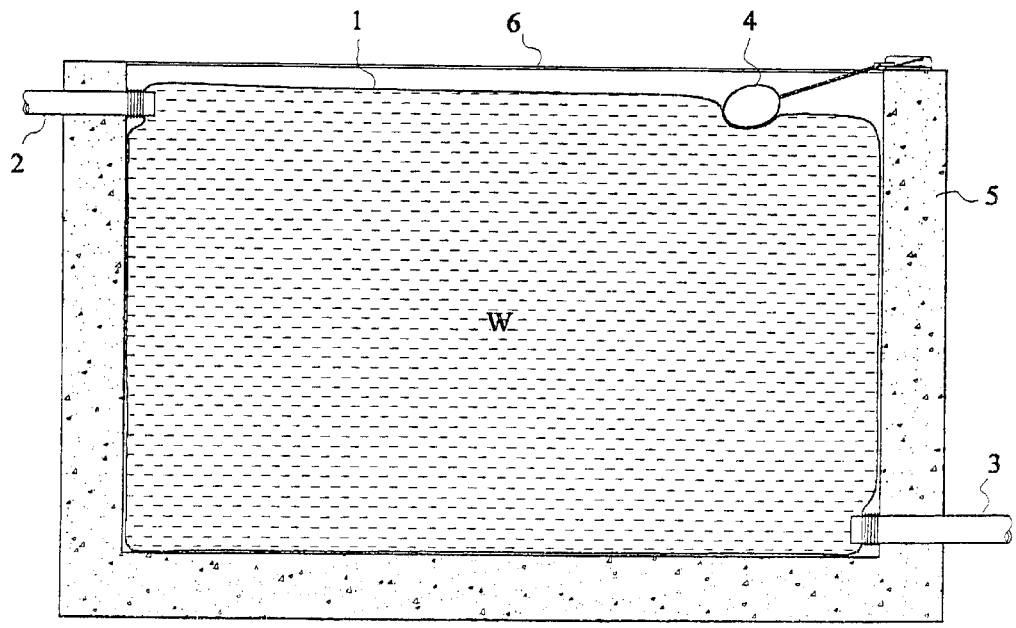
FIG. 2 is a schematic view showing the water stored within the closed water-container storing device with the water inlet/outlet in FIG. 1 of the present invention being reaching a predetermined level.

In FIG. 2, a schematic view showing the water stored within the closed water-container storing device with water inlet/outlet in FIG. 1 of the present invention being reaching a predetermined level, such as a water-full level is shown. As shown in FIG. 2, said container 1 will push against said float device 4 to cut the inflow of water flowing through the water inlet 2, when said water storing bag container 1 has reached the water-full level. On the contrary, the inflow of water flowing through the water inlet 2 will be triggered when said water storing bag container 1 has reached a water-sufficient insufficient level (not shown). Therefore, said water storing bag container 1 always has enough water for daily use.

By the utilization of the present invention, the water stored within said water storing bag container 1 can be prevented from outside pollution. Since the water storing bag container 1 is disposable, which can be readily repeated or re-used after treatment when it reaches its service time when the water quality is so bad to cause precipitation within the water storing bag container 1. In addition, this invention is not limited to the above illustrated embodiment, but can be applied to many fields. For example, this invention can be used for the storing of fluid rather than water. This invention can also be used in water storing box or water jacket for vehicles.

While this invention is described and illustrated with a preferred embodiment, it is to be understood by those who are skillful in this art that various modifications and variations can be made without departing from the scope of present invention which is specified by the appended claims of present invention.

SYMBOL LIST OF ELEMENTS 1 water storing bag container
2 water inlet
3 water outlet
4 float
5 water tower
6 upper cover

What I claimed is:

1. A closed water container storage device disposed within a housing having a water inlet and a water outlet, said storage device comprising:

a flexible water storing bag container for storing water therein;

a water inlet connected to said flexible water storing bag container to allow water flow into said flexible water storing bag container from a water source;

a water outlet connected to said flexible water storing bag container to allow water flow from said flexible water storing bag container; and a float device installed exterior to said flexible water storing bag container including a float for controlling a maximum level and a minimum level of water within said flexible water storing bag container, so that when water in said flexible water storing bag container is below said minimum level, the float moves out of contact with said flexible water storing bag container, as it collapses with the lowering of the water level therein so as to open said water source to allow water to flow into said flexible water storing bag container through said water inlet, and when water in said flexible water storing bag container rises to said maximum level, said flexible water storing bag container id displaced upwardly to engage said float so as to close said water source to stop water from flowing into said flexible water storing bag container.

2. The closed water-container storing device according to claim 1, wherein said flexible water storing bag container is made of rubber.

3. The closed water-container storing device according to claim 1, wherein said flexible water storing bag container is made of plastic film.

4. The closed water-container storing device according to claim 1, wherein said flexible water storing bag container is made of silicon.

* * * * *